United States Patent [19]
Partida

[11] Patent Number: 5,782,516
[45] Date of Patent: Jul. 21, 1998

[54] HAND-WORN APPARATUS FOR LIFTING COMPACT DISKS AND OTHER DELICATE ARTICLES

[76] Inventor: Alfonso Partida, 6415 Via Baron, Rancho Palos Verdes, Calif. 90275

[21] Appl. No.: 759,041

[22] Filed: Dec. 2, 1996

[51] Int. Cl.⁶ .................................................. B25J 15/06
[52] U.S. Cl. ........................... 294/25; 2/159; 294/64.1
[58] Field of Search ..................... 294/1.2, 25, 64.1; 2/16, 21, 159, 160, 161.8, 168; 224/218, 219, 267; 623/65; 414/941

[56] References Cited

U.S. PATENT DOCUMENTS

| 1,705,221 | 3/1929 | Jones ........................ 294/64.1 |
| 1,885,572 | 11/1932 | Wood ........................... 2/168 X |
| 2,922,873 | 1/1960 | Bibbero et al. ............ 294/64.1 X |
| 3,636,568 | 1/1972 | Stuner ........................ 294/25 X |
| 4,211,445 | 7/1980 | Woods ........................... 294/25 |
| 4,516,800 | 5/1985 | Coronado ..................... 294/25 X |
| 5,120,304 | 6/1992 | Sasaki .......................... 2/159 X |
| 5,314,223 | 5/1994 | Harper et al. ............... 294/64.1 |

FOREIGN PATENT DOCUMENTS

| 111124 | 5/1965 | Netherlands ................ 2/161.8 |

*Primary Examiner*—Johnny D. Cherry
*Attorney, Agent, or Firm*—Larry D. Johnson

[57] ABSTRACT

A hand-worn apparatus for releasably lifting a compact disk or other delicate or hard to handle article includes at least one suction cup element disposed on a housing member such as a glove, a vacuum line connected to the suction cup and a vacuum source, and a manual switch for selectively drawing a vacuum from the vacuum source through the vacuum line to the suction cup. When the switch is activated, a vacuum is drawn through the vacuum line to the suction cup, enabling temporary attachment to and lifting of the delicate article. When the switch is deactivated, the vacuum is stopped, thereby releasing the article.

8 Claims, 4 Drawing Sheets

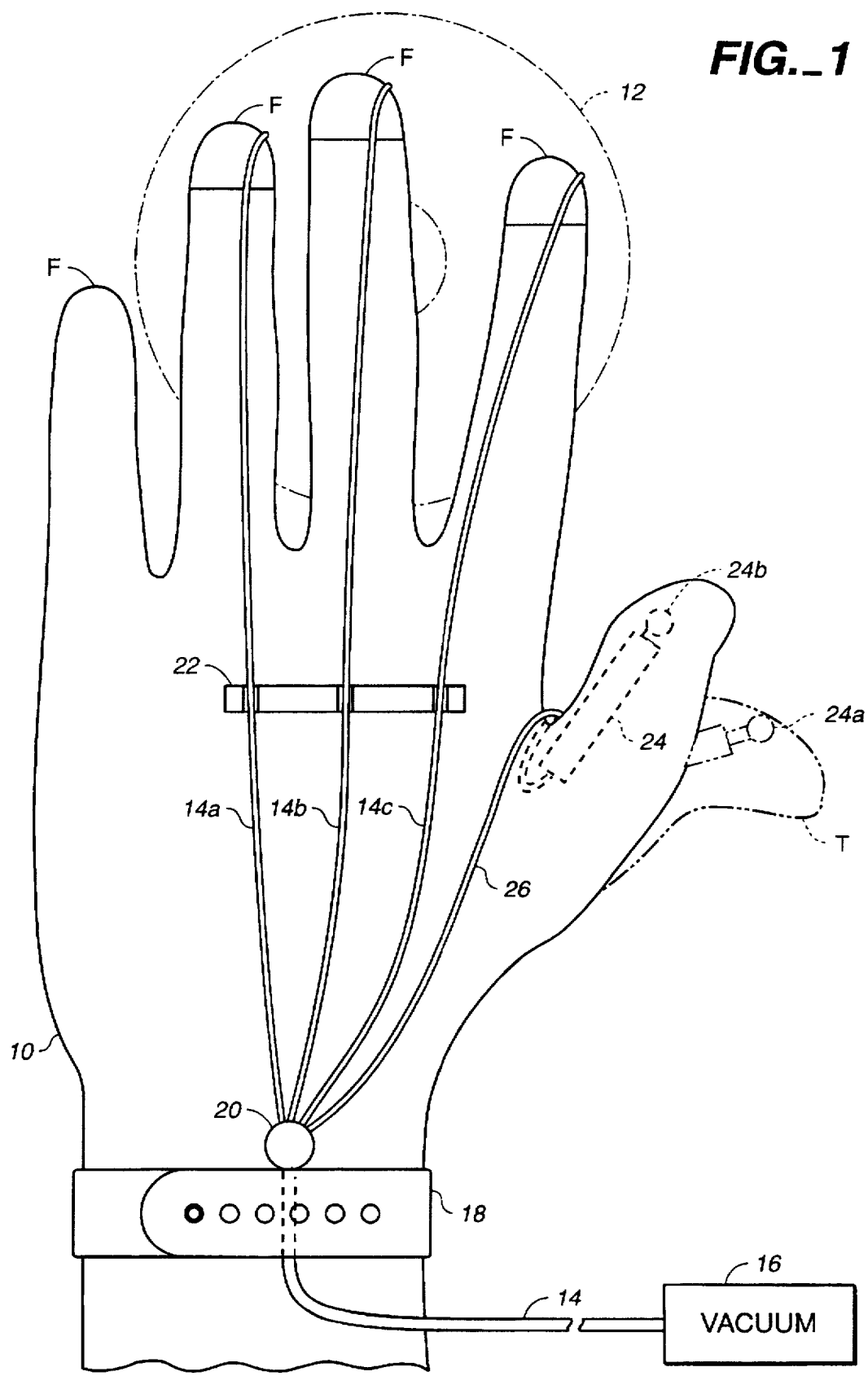
FIG._1

FIG._2
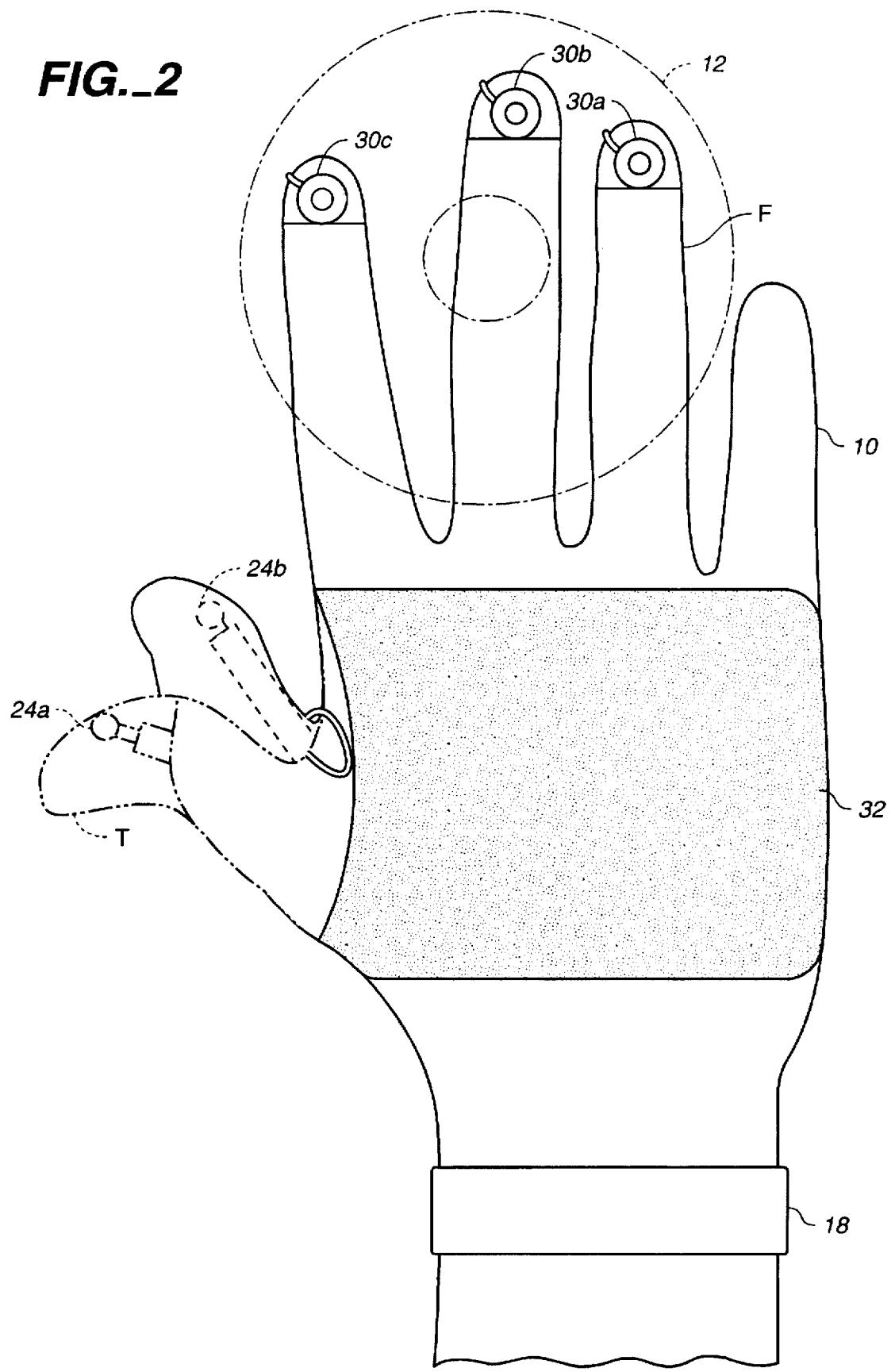

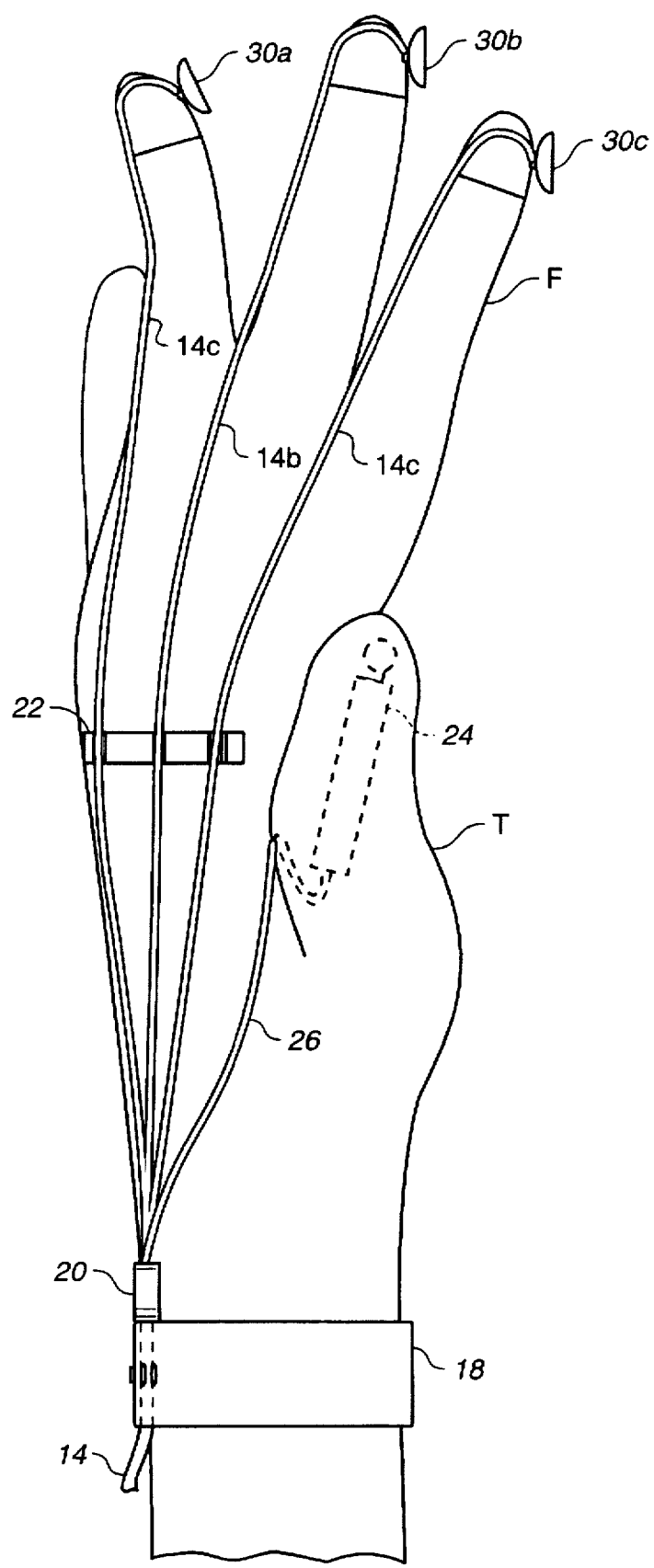

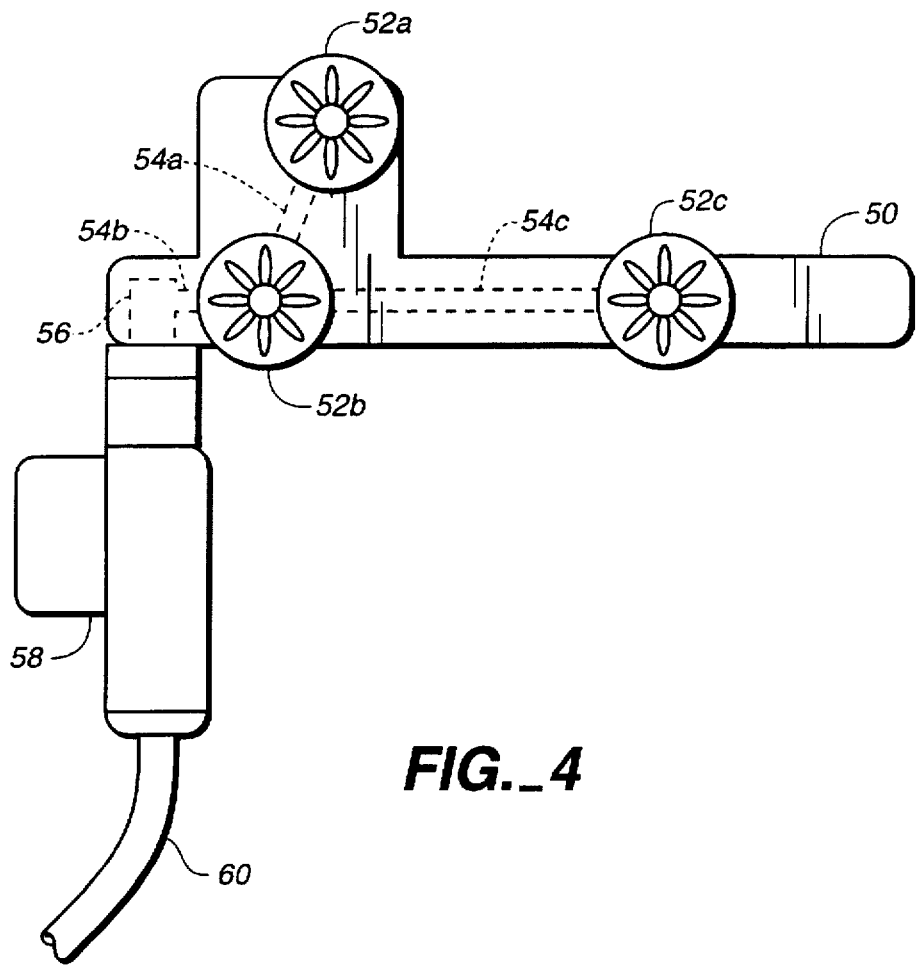
*FIG._4*
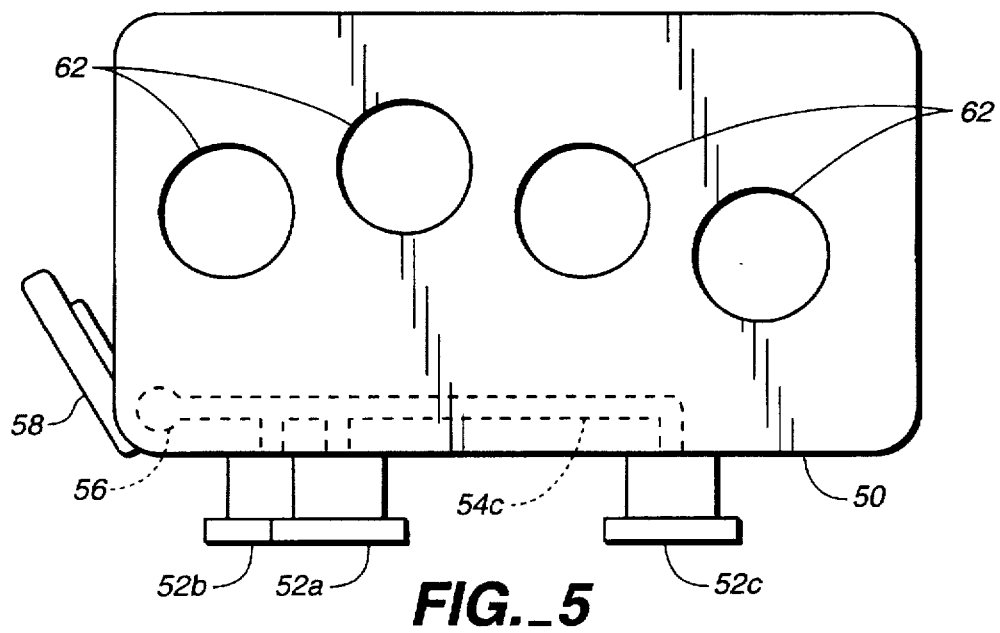
*FIG._5*

HAND-WORN APPARATUS FOR LIFTING COMPACT DISKS AND OTHER DELICATE ARTICLES

BACKGROUND OF THE INVENTION

1. Field of the Invention

This invention relates generally to hardware and associated equipment for handling articles, and more specifically to an improved hand-worn apparatus for lifting delicate or hard to handle articles such as compact disks.

2. Description of the Prior Art

Numerous devices have been developed for lifting and handling articles, such as those handling devices that may be used in assembly line and product packaging environments. However, some delicate or hard to handle articles, such as compact disks, require special handling to avoid surface scratches or other damage.

SUMMARY OF THE INVENTION

This invention provides a hand-worn apparatus for releasably lifting a compact disk or other delicate or hard to handle article. The inventive apparatus includes at least one suction cup element disposed on a housing member such as a glove, a vacuum line connected to the suction cup element and a vacuum source, and a manual switch for selectively drawing a vacuum from the vacuum source through the vacuum line to the suction cup element. When the switch is activated, a vacuum is drawn from the vacuum source, through the vacuum line, and through the suction cup element, enabling temporary attachment to and lifting of the delicate article. When the switch is deactivated, the vacuum is stopped, thereby releasing the article.

In the preferred embodiment, the apparatus includes at least three suction cup elements arranged in non-linear fashion to define a plane, such as where each suction cup element is disposed on a different finger portion of the glove, and the switch is disposed on the thumb portion of the glove. The switch itself may consist of a momentary switch adapted to open or close the vacuum line.

The inventive apparatus is designed to handle delicate articles such as compact disks without scratching their surface. The apparatus attaches to the user's hand for improved productivity and comfort, as well as increased control for the user.

An alternate embodiment provides a housing member consisting of a block bearing finger holes for insertion of a user's fingers. In this embodiment, the switch may be mounted on the side of the block adjacent the finger holes and above the suction cup element(s).

BRIEF DESCRIPTION OF THE DRAWINGS

FIG. 1 is a plan view of a glove embodiment of the hand-worn apparatus of this invention (left hand, palm down);

FIG. 2 is a plan view of the glove embodiment of FIG. 1 (left hand, palm up);

FIG. 3 is a side elevation view of the glove embodiment of FIG. 1;

FIG. 4 is a bottom plan view of a block embodiment of the hand-worn apparatus of this invention (left hand, palm up); and FIG. 5 is a front elevation view of the block embodiment of FIG. 4.

DETAILED DESCRIPTION OF A PREFERRED EMBODIMENT

FIG. 1 is a plan view of a first embodiment of the hand-worn apparatus for lifting delicate articles of this invention illustrating a housing member in the form of a glove 10 with a series of suction cup elements (not visible in this view) disposed on the fingers F of the glove to pick up a compact disk 12 as described herein. In this embodiment, the operative hardware is strapped to the outside of the glove. Vacuum line 14 from vacuum source 16 is attached to the glove 10 by adjustable brace 18. Manifold 20 splits the vacuum line into sub-lines 14a, 14b, 14c, over line clamp 22, and to the respective suction cup elements. Switch 24 (such as a valve adapted to control the vacuum flow, either mechanically, electrically or otherwise) is preferably located in or adjacent the thumb T of the glove, and is connected to the vacuum line via switch line 26. In the preferred embodiment, switch 24 is configured to be open (suction on) when the user's thumb is extended (as in position 24a), and (closed, suction off) when the user's thumb is in a natural bend position. Other configurations can of course be implemented.

FIG. 2 is a plan view of the underside of the glove embodiment, here illustrating the plurality of suction cup elements 30a, 30b, 30c disposed on the fingers F of the glove 10. These suction cup elements are preferably arranged in non-linear fashion to define a plane, e.g., proximate the ends of the first three fingers. It is believed that this planar arrangement provides superior lifting and control characteristics for the article being lifting.

Glove 10 may be constructed of a heavy duty two-layer plastic material, and may include a palm area 32 made of soft sponge material. The glove can be designed for any size hands, in right or left-hand configurations.

FIG. 3 is a side view of the glove embodiment illustrating the flexibility inherent in placement of the suction cup elements 30a, 30b, 30c on the ends of the fingers F.

FIG. 4 is a bottom plan view of a second embodiment of the hand-worn apparatus of this invention, illustrating a housing member in the form of block 50. Here, the block can be configured so that the suction cup elements 52a, 52b, 52c are arrayed in a desirable fashion, such as the non-linear coplanar arrangement described supra. The vacuum sublines 54a, 54b, 54c can be run through the block itself to a manifold 56, thence to a switch 58 to operate the vacuum line 60.

FIG. 5 is a front elevation view of the block embodiment of FIG. 4. This view illustrates the plurality of finger holes 62 that may be formed in the housing block 50, such that the apparatus is worn on the hand like "brass-knuckles". Switch 58 is disposed to the side of the block for ready manipulation by the user's thumb.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. An apparatus for releasably lifting a delicate article by a user's hand, said apparatus comprising:

at least one suction cup element disposed on a glove member;

a vacuum line connected to said suction cup element, said vacuum line including means for connection to a vacuum source; and manual switch means for selectively drawing a vacuum from the vacuum source through said vacuum line to said suction cup element, wherein when said switch means is activated, a vacuum is drawn from the vacuum source, through said vacuum line and through said suction cup element, enabling temporary attachment to and lifting of a delicate article by said apparatus, and when said switch means is deactivated, the vacuum is not drawn through said vacuum line and suction cup element, thereby releasing the article from said apparatus.

2. The apparatus for releasably lifting a delicate article of claim 1 wherein said at least one suction cup element comprises at least three suction cup elements arranged in non-linear fashion to define a plane.

3. The apparatus for releasably lifting a delicate article of claim 1 wherein said vacuum line comprises a plurality of sub-lines from each of said suction cup elements to a manifold.

4. The apparatus for releasably lifting a delicate article of claim 3 wherein said plurality of sub-lines are attached to said glove member by a line clamp.

5. The apparatus for releasably lifting a delicate article of claim 1 wherein said vacuum line is attached to said glove member by an adjustable brace.

6. The apparatus for releasably lifting a delicate article of claim 1 wherein said glove member includes finger portions, and each of said suction cup elements is disposed on a different finger portion.

7. The apparatus for releasably lifting a delicate article of claim 1 wherein said glove member includes a thumb portion, and said switch means is disposed on said thumb portion.

8. The apparatus for releasably lifting a delicate article of claim 1 wherein said switch means comprises a valve to open or close said vacuum line.

* * * * *